(12) United States Patent
Kitamura

(10) Patent No.: US 7,791,733 B2
(45) Date of Patent: Sep. 7, 2010

(54) SEMICONDUCTOR RING LASER GYRO

(75) Inventor: Atsushi Kitamura, Shizuoka (JP)

(73) Assignee: Minebea Co., Ltd., Nagano (JP)

( * ) Notice: Subject to any disclaimer, the term of this patent is extended or adjusted under 35 U.S.C. 154(b) by 241 days.

(21) Appl. No.: 12/180,835

(22) Filed: Jul. 28, 2008

(65) Prior Publication Data
US 2009/0051922 A1 Feb. 26, 2009

(30) Foreign Application Priority Data
Aug. 1, 2007 (JP) ............................. 2007-200559

(51) Int. Cl.
*G01C 19/66* (2006.01)
(52) U.S. Cl. .................................................. 356/471
(58) Field of Classification Search .............. 356/459, 356/471
See application file for complete search history.

(56) References Cited

U.S. PATENT DOCUMENTS 7,701,584 B2 * 4/2010 Akanuma et al. ........... 356/459

2006/0285118 A1 * 12/2006 Feugnet et al. .............. 356/471
2009/0027684 A1 * 1/2009 Kitamura .................... 356/462
2009/0051922 A1 * 2/2009 Kitamura .................... 356/459
2009/0086212 A1 * 4/2009 Kitamura .................... 356/460

FOREIGN PATENT DOCUMENTS

| JP | 2001-50753 A | 2/2001 |
| JP | 2003-139539 A | 5/2003 |
| JP | 2006-319104 A | 11/2006 |

\* cited by examiner

*Primary Examiner*—Patrick J Connolly
(74) *Attorney, Agent, or Firm*—Brinks Hofer Gilson & Lione

(57) ABSTRACT

A semiconductor ring laser gyro comprises: a semiconductor laser for emitting light from each of both ends thereof; a splitting means for splitting and guiding the light emitted from the semiconductor laser into two axis directions; a plurality of reflecting means for reflecting the light split and guided by the splitting means into the two axis directions; two optical circuits, in each of which the plurality of reflecting means cause the light to travel in a plane and to enter an end of the semiconductor laser opposite to the end from which the light is emitted; and a blocking means for blocking light traveling in one of the two optical circuits.

6 Claims, 3 Drawing Sheets

SEMICONDUCTOR RING LASER GYRO

REFERENCE TO THE RELATED APPLICATIONS

This application claims priority under 35 U.S.C. §119 to Japanese Patent Application No. JP2007-200559 filed on Aug. 1, 2007, the entire content of which is hereby incorporated by reference.

BACKGROUND OF THE INVENTION

1. Field of the Invention

The present invention relates to a semiconductor ring laser gyro using a semiconductor as a light source, and particularly to a semiconductor ring laser gyro capable of measuring rotational angular velocities about two axes with one semiconductor laser.

2. Description of the Related Arts

A gyroscope has been conventionally known as a means of measuring the rotational angular velocity of an object. Among others, a ring laser gyro, which utilizes the Sagnac effect, is adapted to precisely measure the rotational angular velocity and therefore is widely used, particularly in the aircraft and rocket industries. While an He—Ne gas laser is primarily used as s laser light source for the ring laser gyro described above, a semiconductor laser, which is advantageous in reduction of device size and power consumption, is recently used increasingly (for example, Japanese Patent Application Laid-Open No. 2001-50753, Japanese Patent Application Laid-Open No. 2003-139539, and Japanese Patent Application Laid-Open No. 2006-319104).

FIG. 6 is a top plan view of an example of a conventional semiconductor laser ring gyro. The semiconductor ring laser gyro includes a semiconductor laser 60 mounted on a silicon substrate, four mirrors 61 to 64, and interference light (beat light) pickup mirrors 65 and 66. The semiconductor laser 60 has its both ends provided with an antireflection coating and emits lights respectively from the both ends (refer to Japanese Patent Application Laid-Open No. 2006-319104). The lights emitted from the both ends of the semiconductor laser 60 are caused by the four mirrors 61 to 64 to travel in respective optical circuits in the right hand direction and the left hand direction, wherein light emitted from the semiconductor laser 60 enters an end thereof opposite to en end from which the light is emitted. The optical circuits function as a ring resonator, and a laser oscillation occurs at the both ends of the semiconductor laser 60. The four mirrors 61 to 64 are fabricated by anisotropic etching of a silicon substrate (silicon micromachining technique), and a metal coating or a dielectric multilayer coating is provided (refer to Japanese Patent Application Laid-Open No. 2003-139539, Paragraph 0037). At least one of the four mirrors 61 to 64 is a transmissive mirror adapted to introduce part of the light to the beat light pickup mirrors 65 and 66.

In the semiconductor ring laser gyro described above, when an object rotates about a rotation axis (sensitivity axis) defined by the normal line of the silicon substrate, an optical path difference is generated due to the Sagnac effect between the two paths of the lights traveling respectively in the right hand direction and the left hand directions, and a beat signal based on an oscillation frequency difference is detected. A rotational angular velocity Ω is calculated by a frequency Δf of the beat signal (refer to Patent document 3, Paragraph 0015) according to formula 1 shown below, where A is an area enclosed by the ring optical path, λ is an oscillation wavelength of the ring laser, and L is a length of the ring optical path:

$$\Delta f = \frac{4A}{\lambda L} \Omega \quad \text{Formula 1}$$

To achieve camera image stabilization and construction equipment control, rotational angular velocities about two axes must be measured. The aforementioned semiconductor ring laser gyro built on a silicon substrate is capable of measuring rotational angular velocity about one axis only, and in order to measure rotational angular velocities about a plurality of axes, a number of semiconductor ring laser gyros corresponding to the number of axes are required. This pushes up cost of production and also causes a problem of installation space increase.

SUMMARY OF THE INVENTION

The present invention has been made in consideration of the problems described above, and it is an object of the present invention to provide a semiconductor ring laser gyro in which rotational angular velocities about two axes can be measured with one semiconductor laser.

The invention of claim 1 provides a semiconductor ring laser gyro comprising: a semiconductor laser for emitting light from each of both ends thereof; a splitting means for splitting and guiding the light emitted from the semiconductor laser into two axis directions; a plurality of reflecting means for reflecting the light split and guided by the splitting means into the two axis directions; two optical circuits, in each of which the plurality of reflecting means cause the light to travel in a plane and to enter an end of the semiconductor laser opposite to the end from which the light is emitted; and a blocking means for blocking light traveling in one of the two optical circuits.

In the invention of claim 1, since one semiconductor laser is shared by the two optical circuits, the rotational angular velocities about two axes can be measured with one semiconductor laser. Also, the two optical circuits share an optical path portion and therefore light traveling in an optical circuit about an axis for which rotational angular velocity is not measured is shielded by the blocking means for preventing the resonance from affecting each other. According to the present invention, the number of components is reduced, and a semiconductor ring laser gyro can be provided which is capable of measuring rotational angular velocities about two axes with a small space and at a low cost.

In the invention of claim 2, the one semiconductor laser of the semiconductor ring laser gyro as described in claim 1 is disposed at a portion of an optical path shared in common by the two optical circuits which are disposed in respective different planes. According to this aspect, a semiconductor ring laser gyro can be provided in which rotational angular velocities about two axes oriented to each other not only at 90 degrees but also, for example, at 30 degrees, 45 degrees and 60 degrees can be measured with one semiconductor laser.

In the invention of claim 3, the splitting means of the semiconductor ring laser gyro as described in claim 1 or 2 is a beam splitter which includes a transmissive mirror surface for guiding light into an optical circuit about a first axis and a reflection surface for reflecting light having transmitted through the transmissive surface into an optical circuit about a second axis. According to this aspect, since light is split into two optical circuits by one splitting means, the number of components is reduced. Consequently, a semiconductor ring laser gyro can be provided which is capable of measuring rotational angular velocities about two axes with a small space and at a low cost.

In the invention of claim 4, the blocking means and the blocking means of the semiconductor ring laser gyro as described in claim 1 or 2 are constituted by a combination of a polarization beam splitter and a polarization plane rotating element disposed between the polarization beam splitter and the semiconductor laser. According to this aspect, based on the polarization properties of a semiconductor laser, light emitted from the semiconductor laser is split into two optical circuits without attenuation of light amount. Specifically, the polarization plane of the light from the semiconductor laser is controlled by the polarization plane rotating element, and the polarization beam splitter is adapted to selectively split or shield the two optical circuits according to the polarization plane.

In the invention of claim 5, the polarization beam splitter of the semiconductor ring laser gyro as described in claim 4 is a cube polarization prism which includes two rectangular prisms to sandwich either a dielectric film or a dielectric multilayer film. According to this aspect, the polarization beam splitter can efficiently split light into the two optical circuits by utilizing either the dielectric film or the dielectric multilayer film which is excellent in transmitting and reflecting P polarization light and S polarization light. Also, since the cube polarization prism does not require a robust mounting mechanism unlike a plate polarization prism, the optical axis of the polarization beam splitter which is important as a bifurcation of the two optical axes can be easily adjusted.

In the invention of claim 6, the polarization plane rotating element of the semiconductor ring laser gyro as described in claim 4 is either a liquid crystal element or a Faraday element. According to this aspect, since the liquid crystal element or the Faraday element has a simple structure and can control incident light at a high speed, a semiconductor ring laser gyro can be provided in which the measurement axis can be selected with a small space and at a high speed.

The semiconductor ring laser gyro according to the present invention is capable of measuring the rotational angular velocities about two axes with a small space and at a low cost.

DETAILED DESCRIPTION OF THE INVENTION

Embodiments of the present invention will be described with reference to the drawings.

1. First Embodiment

In the first embodiment, an example of semiconductor ring laser gyro adapted to measure rotational angular velocities about two axes with one semiconductor laser will be explained.

(Structure of the First Embodiment)

Figure 1:
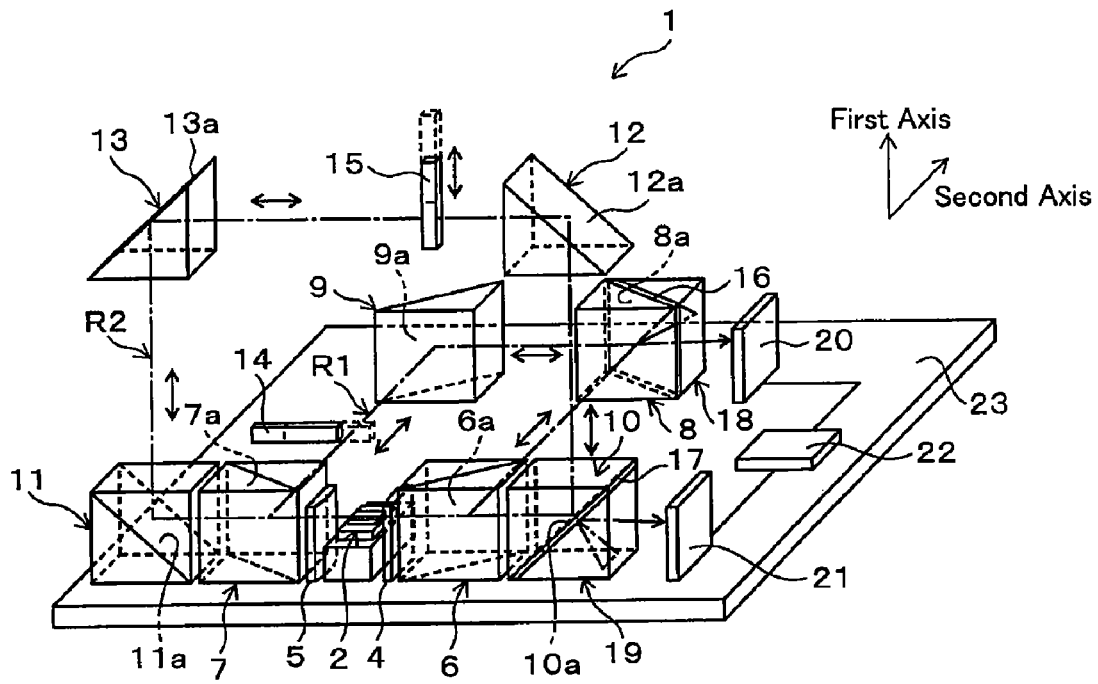
FIG. 1 is a perspective view of a semiconductor ring laser gyro according to a first embodiment.

FIG. 1 is a perspective view of a semiconductor ring laser gyro 1 according to the first embodiment. In the semiconductor ring laser gyro 1, an optical circuit R1 about a first axis vertical to a substrate 23 and an optical circuit R2 about a second axis parallel to the substrate 23 are formed as shown in FIG. 1. The two optical circuits R1 and R2 are oriented orthogonal to each other in the example but may be oriented, for example, at 30 degrees, 45 degrees or 60 degrees with respect to each other. That is to say, when the two optical circuits R1 and R2 are not on the same plane, the semiconductor ring laser gyro 1 is capable of measuring the rotational angular velocities about two axes oriented, for example, at 30 degrees, 45 degrees or 60 degrees with respect to each other.

The semiconductor ring laser gyro 1 includes a semiconductor laser 2, a driving power supply 3 (not shown), two collimator lenses 4 and 5, two splitting means 6 and 7, six reflecting means 8 to 13, two blocking means 14 and 15, two transmissive mirrors 16 and 17, two beam multiplexing prisms 18 and 19, two light receiving portions 20 and 21, and a signal processing portion 22. The semiconductor laser 2 is disposed at a portion of an optical path shared in common by the two optical circuits R1 and R2. The semiconductor laser 2 includes an n-type cladding layer/an active layer/a p-type cladding layer made of AlGaAs and GaAs material in a double heterostructure, electrodes, and the like. An antireflection coating is applied to each of both end faces of the active layer of the semiconductor laser 2, and light with a wavelength of a visible light or an infrared light is emitted from each of the both end faces of the active layer. The antireflection coating is formed of a dielectric film or multilayer film determined in consideration of the refractive index and the chemistry of the active layer of the semiconductor laser 2.

The driving power supply 3 (not shown) is connected to the electrodes of the semiconductor laser 2. The driving power supply 3 applies a voltage to the electrodes thereby causing stimulated-emission of a photon from the active layer of the semiconductor laser 2. Light generated by the stimulated-emission emerges from each of the both end faces of the active layer. Light emitted from one end of the semiconductor laser 2 goes through either of the two optical circuits R1 and R2 and enters the active layer from the other end face, and stimulated-emission of a photon is newly caused. With this phenomenon, the semiconductor laser 2 generates laser oscillation. The semiconductor ring laser gyro 1 using a semiconductor laser as a laser light source as described above has an advantage in reducing device size and power consumption over a semiconductor ring laser gyro using an He—Ne gas laser.

The collimator lenses 4 and 5 are a plano-convex lens, a cylindrical lens or a toroidal lens which is made of quartz glass ($SiO_2$), transparent plastic resin (for example, thermoplastic resin, acrylic resin, polycarbonate resin, polyolefin resin, and the like), calcium fluoride ($CaF_2$), lithium fluoride (LiF), or magnesium fluoride ($MgF_2$). The collimator lenses 4 and 5 are disposed respectively at the both ends of the semiconductor laser 2 to be aligned on the light emission axis of the semiconductor laser 2. The lights emitted respectively from the both end faces of the active layer of the semiconductor laser 2 are collimated by the collimator lens 4 and 5 to become parallel lights and enter the splitting means 6 and 7. In this connection, the collimator lens 4 and 5 may be discrete from the splitting means 6 and 7 and joined thereto, or may alternatively be integrated with the splitting means 6 and 7 such that the light entrance faces of the splitting means 6 and 7 are shaped aspheric. In such a structure, a mounting mechanism for the collimator lenses 4 and 5 is not required, which results in reducing influences attributable to the disturbances, such as temperature change, vibration, and the like.

The splitting means 6 and 7 are a beam splitter adapted to split light from the semiconductor laser 2 into the two optical circuits R1 and R2. The splitting means 6 and 7 are a cube beam splitter composed of two rectangular prisms which are made of one of the above-mentioned materials for the collimator lenses 4 and 5, possibly using the same material as the collimator lenses 4 and 5, and which are put together with their respective inclined surfaces joined to each other. Semi-transmissive mirror surfaces 6a and 7a are formed at the inclined surfaces of the rectangular prisms of the splitting means 6 and 7. The semi-transmissive mirror surfaces 6a and 7a are constituted by a semi-transmissive film (half mirror) which is made of a dielectric multilayer film including a high-refractive film H (for example $TiO_2$) and a low refractive film L (for example $SiO_2$) deposited alternately on each other, or made of a metal film (Al, Au, Ag and the like). Referring to FIG. 1, the splitting means 6 and 7 are disposed to be aligned on the light emission axis of the semiconductor laser 2, and the semi-transmissive mirror surfaces 6a and 7a are inclined at 45 degrees with respect to the light emission axis of the semiconductor laser 2 and are parallel to the first axis. The semi-transmissive mirror surfaces 6a and 7a of the splitting means 6 and 7 are disposed symmetric to each other with respect to the semiconductor laser 2. The lights from the both ends of the semiconductor laser 2 are each split at the semi-transmissive mirror surfaces 6a and 7a into the two optical circuits R1 and R2. The lights adapted to travel in the optical circuit R1 around the first axis are internally reflected at the semi-transmissive mirror surfaces 6a and 7a and enter the reflecting means 8 and 9, respectively. On the other hand, the lights adapted to travel in the optical circuit R2 around the second axis are transmitted through the semi-transmissive mirror surfaces 6a and 7a and enter the reflecting means 10 and 11, respectively.

The reflecting means 8 and 9 are a rectangular prism made of one of the above-mentioned materials for the collimator lenses 4 and 5, possibly using the same material as the collimator lenses 4 and 5. Referring to FIG. 1, reflection surfaces 8a and 9a of the reflecting means 8 and 9 are disposed symmetric respectively to the semi-transmissive mirror surfaces 6a and 7a of the splitting means 6 and 7 and are inclined at 45 degrees relative to the direction of lights from the splitting means 6 and 7. The reflecting means 8 and 9 receive the lights from the splitting means 6 and 7, and the lights received are internally reflected at the reflection surfaces 8a and 9a and emitted from the reflecting means 8 and 9. Accordingly, if the refractive index of air is 1, the reflecting means 8 and 9 have a refractive index n of about 1.4 or more given from the Snell's law according to formula 2 shown below:

$$n \geq 1/\sin \theta \quad \text{Formula 2}$$

As described above, the optical circuit R1 around the first axis of the semiconductor ring laser gyro 1 is shaped rectangular as a result of the internal reflections at the two splitting means 6 and 7 and the two reflecting means 8 and 9. On the other hand, the optical circuit R2 around the second axis of the semiconductor ring laser gyro 1 is shaped rectangular as a result of the internal reflections at the four reflecting means 10 to 13. In this connection, the reflecting means to form the two optical circuits R1 and R2 do not have to be reflection prisms but may be plate mirrors, and also the optical circuits R1 and R2 may be shaped polygonal such as triangular, pentagonal and the like.

The reflecting means 10 and 11 are a cube prism composed of two rectangular prisms which are made of one of the above-mentioned materials for the collimator lenses 4 and 5, possibly using the same material as the collimator lenses 4 and 5, and which are put together with their respective inclined surfaces joined to each other. Referring to FIG. 1, the reflecting means 10 and 11 are disposed to be aligned on the light emission axis of the semiconductor laser 2, and reflection surfaces 10a and 11a of the reflecting means 10 and 11 are inclined at 45 degrees relative to the emission axis of the light from the ends of the semiconductor laser 2 and are parallel to the second axis. The reflection surface 10a of the reflecting means 10 and the reflection surface 11a of the reflecting means 11 are disposed symmetric to each other with respect to the semiconductor laser 2. The reflecting means 10 and 11 receive the lights split at and emitted from the splitting means 6 and 7, and the lights received are internally reflected at 45 degrees at the reflection surfaces 10a and 11a and enter the reflecting means 12 and 13, respectively.

The reflecting means 12 and 13 are a rectangular prism made of one of the above-mentioned materials for the collimator lenses 4 and 5, possibly using the same material as the collimator lenses 4 and 5. Referring to FIG. 1, reflection surfaces 12a and 13a of the reflecting means 12 and 13 are disposed symmetric respectively to the reflection surfaces 10a and 11a of the reflecting means 10 and 11 and are inclined at 45 degrees relative to the emission lights from the reflecting means 10 and 11. The reflecting means 12 and 13 receive the lights emitted from the reflecting means 10 and 11, and the lights received are internally reflected at the reflection surfaces 12a and 13a and emitted from the reflecting means. The reflecting means 10 to 13 have a refractive index n of about 1.4 or more according to formula 2 mentioned earlier.

The two optical circuits R1 and R2 shaped rectangular and traveling about the first axis and the second axis, respectively, have a common path portion at the semiconductor laser 2, and therefore, in order to prevent it from happening that lights traveling respectively in the two optical circuits R1 and R2 affect each other at the time of ring resonance, light traveling in one optical circuit about one axis for which rotational angular velocity is not measured is shielded by either of the blocking means 14 and 15.

The blocking means 14 and 15 are disposed at any portion of the respective optical circuits except the aforementioned common path portion shared by the two optical circuits R1 and R2. In the present example, the blocking means 14 is disposed between the splitting means 7 and the reflecting means 9, and the blocking means 15 is disposed between the reflecting means 12 and the reflecting means 13. The blocking means 14 and 15 may be constituted by, for example, a slidable light blocking plate, two polarization filters, or a liquid crystal shutter. When the blocking means 14 and 15 are constituted by a slidable light blocking plate, a slide mechanism incorporating a motor as a driving source is employed (not shown). When the blocking means 14 and 15 are constituted by two polarization filters, a rotation mechanism to rotate one polarization filter is employed (not shown). And when the blocking means 14 and 15 are constituted by a liquid crystal shutter, an electronic circuit incorporating a switching element is employed (not shown). The blocking means 14 and 15 shield light traveling in an optical circuit about one axis for which rotational angular velocity is not measured. Specifically, when the rotational angular velocity about the first axis is measured, the blocking means 15 shields light traveling in the optical circuit R2 about the second axis, and when the rotational angular velocity about the second axis is measured, the blocking means 14 shields light traveling in the optical circuit R1 about the first axis.

Lights traveling respectively in the optical circuits R1 and R2 about the first and second axes in the right hand direction (CW light) and in the left hand direction (CCW light) are partly picked up by the transmissive mirrors 16 and 17 each formed at either of the reflecting means 8 to 13 of the two optical circuits R1 and R2. The CW light and the CCW light picked up at the transmissive mirrors 16 and 17 are multiplexed by the beam multiplexing prisms 18 and 19 and turned into interference light (beat light).

The transmissive mirrors 16 and 17 are a partially-transmissive film or a semi-transmissive film (half mirror) which is made of a dielectric multilayer film including a high-refractive film H (for example $TiO_2$) and a low refractive film L (for example $SiO_2$) deposited alternately on each other, or made of a metal film (Al, Au, Ag and the like). The transmissive mirror 16 is formed at the reflection surface of either of the two reflecting means 8 and 9 of the optical circuit R1 about the first axis. In the present example, the transmissive mirror 16 is formed at the reflecting surface 8a of the reflecting means 8. Accordingly, the CW and CCW lights traveling in the optical circuit R1 about the first axis are caused to partly transmit through the reflection surfaces 8a. The two lights having transmitted enter the beam multiplexing prism 18. On the other hand, the transmissive mirror 17 is formed at the reflection surface of one of the four reflecting means 10 to 13 of the optical circuit R2 about the second axis. In the present example, the transmissive mirror 17 is formed at the reflection surface 10a of the reflecting means 10. Accordingly, the CW and CCW lights traveling in the optical circuit R2 about the second axis are caused to partly transmit through the reflection surface 10a. The two lights having transmitted enter the beam multiplexing prism 19.

The beam multiplexing prisms 18 and 19 are made of one of the above-mentioned materials for the collimator lenses 4 and 5, possibly using the same material as the collimator lenses 4 and 5. The beam multiplexing prism 18 is joined to the reflection surface 8a of the reflecting means 8 having the transmissive mirror 16 formed thereon. On the other hand, the beam multiplexing prism 19 is joined to the reflection surface 10a of the reflecting means 10 having the transmissive mirrors 17 formed thereon. The CW and CCW light enter the beam multiplexing prisms 18 and 19, are internally reflected therein and are emitted therefrom along a common axis. Thus, beat light of the CW and CCW lights is picked up. The beat light traveling about the first axis and picked up is received at the light receiving portion 20, and the beat light traveling about the second axis and picked up is received at the light receiving portion 21. In this connection, the beat lights about the first and second axes may be guided by a mirror so as to be received at one receiving portion. This structure further reduces the number of components, and the semiconductor ring laser gyro 1 is further advantageous in space saving and cost reduction.

The light receiving portions 20 and 21 are disposed on the axis of the lights emitted from the beam multiplexing prisms 18 and 19 and are constituted by a photodiode, a phototransistor or a photo IC. The light receiving portions 20 and 21 receive beat lights emitted from the beam multiplexing prisms 20 and 21 and convert the amount of the light into a current value. The current is appropriately amplified by an operation amplifier and converted into a voltage value by a variable resistor. The voltage value is compared with a reference voltage by a comparator (not shown) and converted into a pulse signal of 0 or 1 (beat signal).

The signal processing portion 22 is a microcomputer which includes a ROM (read only memory) to store programs and data, a CPU (central processing unit) to perform arithmetic processing based on the program stored in the ROM, a RAM (random access memory) to temporarily store the program and data run by the CPU, a counter to measure the clock number of pulse signal, and a clock oscillator. The signal processing portion 12 receives beat signals from the light receiving portions 20 and 21, whereby the clock number of the beat signals (beat frequency) is measured by the counter. The signal processing portion 22 calculates an angular velocity $\Omega$ from the beat frequency $\Delta f$ measured. That is to say, in the semiconductor ring laser gyro 1, the rotational angular velocity of an object about two axes can be detected based on the Sagnac effect (optical path difference between CW light and CCW light) caused when the object rotates.

(Advantages of the First Embodiment)

The advantage of the first embodiment will hereinafter be described. A conventional semiconductor ring laser gyro is capable of measuring a rotational angular velocity about one axis only. Consequently, when rotational angular velocities about a plurality of axes must be measures, a number of semiconductor ring laser gyros corresponding to the number of the axes are required. On the other hand, in the semiconductor ring laser gyro 1 according to the first embodiment, one semiconductor laser is shared by the two optical circuits R1 and R2, and therefore the rotational angular velocities about two axes can be measured inexpensively with a small space.

2. Second Embodiment

In the second embodiment, an example of semiconductor ring laser gyro adapted to measure rotational angular velocities about two axes with one semiconductor laser will be explained, where a splitting means to split light from the semiconductor laser into two optical circuits is a beam splitter which includes a semi-transmissive mirror surface to guide light into an optical circuit about a first axis and a reflection surface to reflect and guide light having transmitted through the semi-transmissive mirror surface into an optical circuit about a second axis. In explaining the example, any components and structures identical with or similar to those of the first embodiment will be denoted by the same reference numerals.

(Structure of the Second Embodiment)

Figure 2:
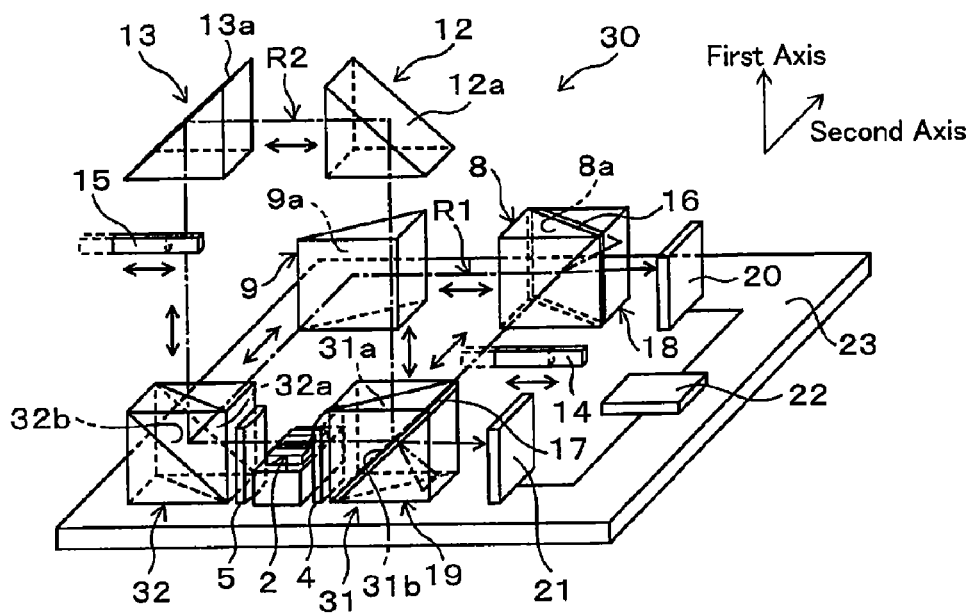
FIG. 2 is a perspective view of a semiconductor ring laser gyro according to a second embodiment.

FIG. 2 is a perspective view of a semiconductor ring laser gyro 30 according to the second embodiment. Referring to FIG. 2, the semiconductor ring laser gyro 30 includes a semiconductor laser 2, a driving power supply 3 (not shown), two collimator lenses 4 and 5, two splitting means 31 and 32, four reflecting means 8, 9, 12 and 13, two blocking means 14 and 15, two transmissive mirrors 16 and 17, two beam multiplexing prisms 18 and 19, two light receiving portions 20 and 21, and a signal processing portion 22.

The splitting means 31 and 32 are a beam splitter adapted to split light from the semiconductor laser 2 into two optical circuits R1 and R2 oriented orthogonal to each other. The splitting means 31 and 32 are made of one of the earlier-mentioned materials for the collimator lenses 4 and 5, possibly using the same material as the collimator lenses 4 and 5 and have a cubic shape, wherein the splitting means 31 includes a semi-transmissive mirror surface 31a and a reflection surface 31b and the splitting means 32 includes a semi-transmissive mirror surface 32a and a reflection surface 32b. The semi-transmissive surfaces 31a and 32a each reflect half of light emitted from the semiconductor laser 2 into the optical circuit R1 about the first axis, and the reflection surfaces 31b and 32b reflect lights having transmitted through the semi-transmissive mirror surfaces 31a and 32 into the optical circuit R2 about the second axis. The semi-transmissive mirror surfaces 31a and 32a are constituted by a semi-transmissive film (half mirror) which is made of a dielectric multilayer film including a high-refractive film H (for example $TiO_2$) and a low refractive film L (for example $SiO_2$) deposited alternately on each other, or made of a metal film (Al, Au, Ag and the like), and the reflection surfaces 31b and 32b are an internal reflection surface in the prism. Referring to FIG. 2, the splitting means 31 and 32 are disposed to be aligned on the light emission axis of the semiconductor laser 2, the semi-transmissive mirror surfaces 31a and 32a are disposed symmetric to each other with respect to the semiconductor laser 2, and the reflection surfaces 31b and 32b are disposed symmetric to each other with respect to the semiconductor laser 2. The lights reflected at the semi-transmissive mirror surfaces 31a and 32a and guided into the optical circuit R1 about the first axis enter the reflecting means 8 and 9. On the other hand, the lights reflected at the reflection surfaces 31b and 32b and guided into the optical circuit R2 about the second axis enter the reflecting means 12 and 13.

The CW and CCW lights each guided by the splitting means 31 and 32 into the two optical circuits R1 and R2 are partly picked up by the transmissive mirrors 16 and 17 formed at either reflection surfaces of each of the optical circuits. The CW and CCW lights picked up at the transmissive mirrors 16 and 17 are multiplexed at the beam multiplexing prisms 18 and 19 into an interference light (beat light). In this example, the transmissive mirror 16 is formed at the reflection surface 8a of the reflecting means 8, and the beam multiplexing prism 18 is joined to the reflection surface 8a of the reflecting means 8 as shown in FIG. 2. On the other hand, the transmissive mirror 17 is formed at the reflection surface 31b of the splitting means 31, and beam multiplexing prism 19 is joined to the reflection surface 31b of the splitting means 31 as shown in FIG. 2.

(Advantage of the Second Embodiment)

The advantage of the second embodiment will hereinafter be described. In the semiconductor ring laser gyro 30 according to the second embodiment, light is split and guided by one splitting means into the two optical circuits R1 and R2 orthogonal to each other, and therefore the number of components is reduced and an apparatus can save space and be produced at a low cost.

3. Third Embodiment

In the third embodiment, an example of semiconductor ring laser gyro adapted to measure rotational angular velocities about two axes with one semiconductor laser will be explained, where a splitting means to split light from the semiconductor laser into two optical circuits and a blocking means to shield light traveling in one of the two optical circuits are constituted by a combination of a polarization beam splitter and a polarization plane rotating element. In explaining the example, any components and structures identical with or similar to those of the first embodiment will be denoted by the same reference numerals.

(Structure of the Third Embodiment)

Figure 3A:
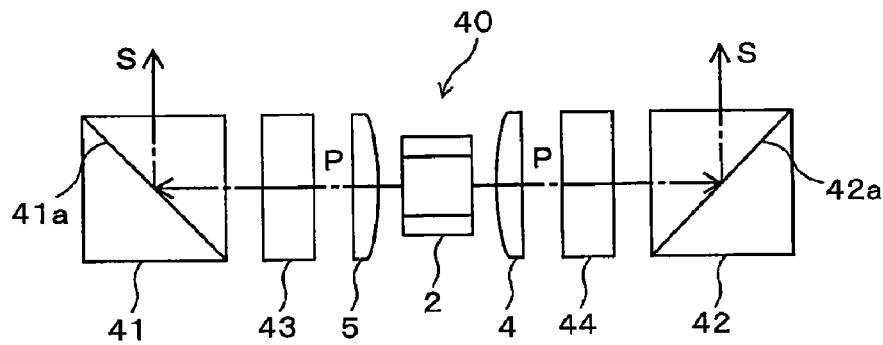
FIG. 3(A) is a top plan view of a semiconductor ring laser gyro, where light is guided into an optical circuit about a first axis.
Figure 3B:
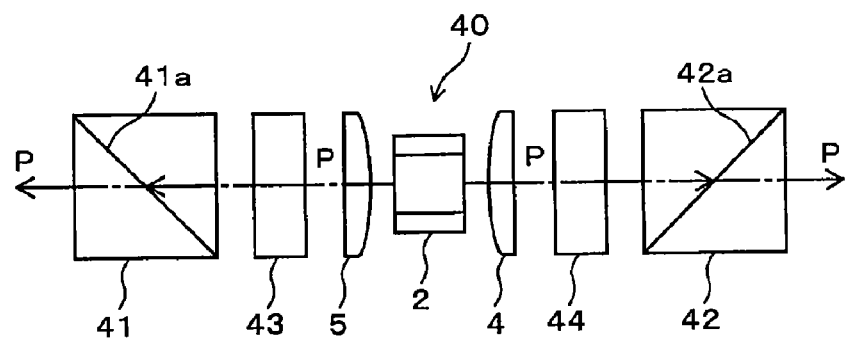
FIG. 3(B) is a top plan view of the semiconductor ring laser gyro, where light is guided into an optical circuit about a second axis.

FIG. 3(A) is a top plan view of a relevant portion of a semiconductor ring laser gyro 40 according to the third embodiment, where light is guided into an optical circuit about a first axis, and FIG. 3(B) is a top plan view of the same portion, where light is guided into an optical circuit about a second axis. Referring to FIGS. 3(A) and 3(B), the semiconductor ring laser gyro 40 includes a semiconductor laser 2, polarization beam splitters 41 and 42 disposed respectively at the ends of an optical path shared in common by two optical circuits R1 and R2, and polarization plane rotating elements 43 and 44 disposed between the semiconductor laser 2 and the polarization beam splitters 41 and 42. The polarization plane rotating elements 43 and 44 are disposed between collimator lenses 4 and 5 and the polarization beam splitters 41 and 42 in the example but may alternatively be disposed between the semiconductor laser 2 and the collimator lenses 4 and 5.

The polarization beam splitters 41 and 42 utilize the polarization property of a semiconductor laser and thereby work as a splitting means to guide light into one optical circuit and at the same time work as a blocking means to shield light traveling in the other optical circuit. The polarization beam splitters 41 and 42 may be constituted by, for example, a polarization prism, or a birefringent prism. If the polarization beam splitters 41 and 42 are a polarization prism, the polarization prism is preferably a cube polarization prism composed of two rectangular prisms which are made of quartz glass ($SiO_2$), transparent plastic resin (for example, thermoplastic resin, acrylic resin, polycarbonate resin, polyolefin resin, and the like), calcium fluoride ($CaF_2$), lithium fluoride (LiF), or magnesium fluoride ($MgF_2$), wherein a dielectric film or multilayer film is sandwiched between the inclined surfaces of the two rectangular prisms joined to each other. In the embodiment, the polarization beam splitters 41 and 42 utilize the dielectric film or multilayer film having excellent characteristics in transmitting and reflecting P and S polarization lights thereby effectively splitting light into two optical circuits. Also, while the polarization beam splitters 41 and 42 may alternatively be a plate polarization prism, the cube polarization prism described above does not require a robust mounting mechanism compared with the plate polarization prism and therefore the optical axes of the polarization beam splitters 41 and 42 which are important as a bifurcation point can be adjusted easily when the cube polarization prism is used.

On the other hand, if the polarization beam splitters 41 and 42 are a birefringent prism, the birefringent prism is preferably a Glan-Thomson prism composed of two rectangular prisms which are made of calcite or liquid crystal having birefringent property and which are put together such that their respective inclined surfaces are bonded to each other by Canada balsam or synthetic adhesive, a Glan-Teller prism composed of two rectangular prisms having an air gap between their respective inclined surfaces, or a Glan-laser prism which is a Glan-Teller having its laser resistance increased. The polarization beam splitters 41 and 42 structured as described above have polarization surfaces 41a and 42a adapted to reflect S polarization light as shown in FIG. 3(A) and to transmit P polarization light as shown in FIG. 3(B). The polarization plane of light entering the polarization beam splitters 41 and 42 is controlled by the polarization plane rotating elements 43 and 44.

The polarization plane rotating elements 43 and 44 are constituted by, for example, a liquid crystal element or a Faraday element.

Figure 4A:
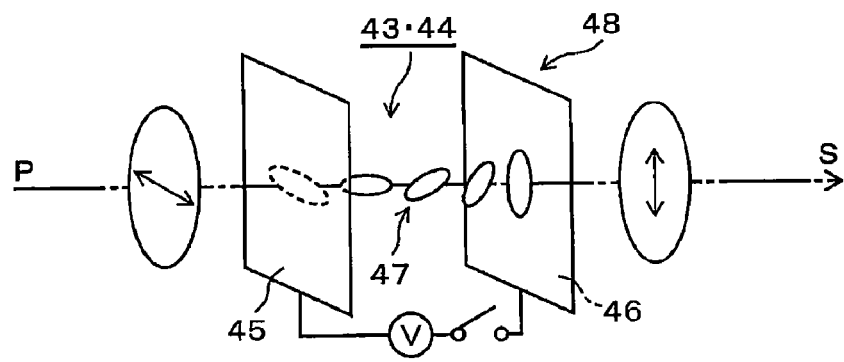
FIG. 4(A) is a schematic view of a liquid crystal element, where a voltage is not applied to the liquid crystal element.
Figure 4B:
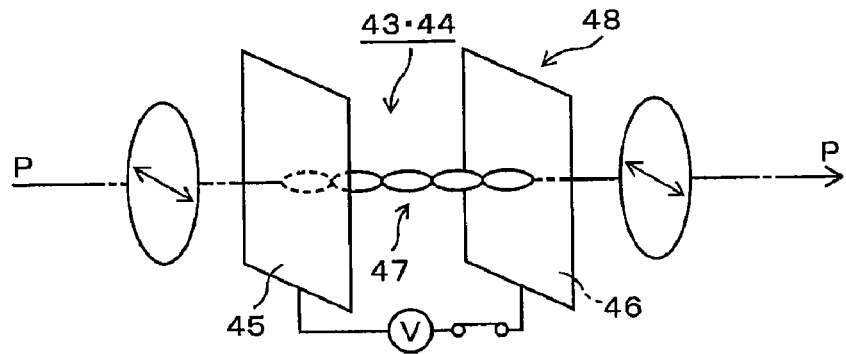
FIG. 4(B) is a schematic view of the liquid crystal element, where a voltage is applied to the liquid crystal element.

First, description will be made on a case in which the polarization plane rotating elements 43 and 44 are a liquid crystal element. FIG. 4(A) is a schematic view of a liquid crystal element 48, where a voltage is not applied to the liquid crystal element 48, and FIG. 4(B) is a schematic view of the liquid crystal element 48, where a voltage is applied to the liquid crystal element 48. The liquid crystal element 48 includes transparent electrodes 45 and 46, two oriented films (not shown) sandwiched between the transparent electrodes 45 and 46, and twisted nematic (TN) liquid crystals 47 sandwiched between the two oriented films. The two oriented films are a polymeric film having a plurality of grooves extending in one direction and have their respective grooves perpendicular to each other. The TN liquid crystals 47 are affected by the two oriented films and twisted at 90 degrees in a spiral manner. When a voltage is applied to the transparent electrodes 45 and 46, the TN liquid crystals 47 are aligned along the electric field direction thus forming a homeotropic alignment.

In the embodiment with the liquid crystal element 48 as described above, when a voltage is not applied to the liquid crystal element 48, P polarization light entering the liquid crystal element 48 and transmitting therethrough has its polarized wave plane rotated by 90 degrees and turns into S polarization light as shown in FIG. 4(A). On the other hand, when a voltage is applied to the liquid crystal element 48, P polarization light entering the liquid crystal element 48 and transmitting therethrough exits as P polarization light without rotating its polarized wave plane as shown in FIG. 4(B). Thus, when a voltage is not applied to the liquid crystal element 48, P polarization lights emitted from the semiconductor laser 2 turn into S polarization lights by the polarization plane rotating elements 43 and 44 constituted by the liquid crystal element 48, and the S polarization lights are guided into the optical circuit R1 about the first axis by the polarization beam splitters 41 and 42 as shown in FIG. 3(A), and on the other hand, when a voltage is applied to the liquid crystal element 48, P polarization lights emitted from the semiconductor laser 2 transmit through the polarized plate rotating elements 43 and 44 without rotating its polarized wave plane and are guided into the optical circuit R2 about the second axis by the polarization beam splitters 41 and 42 as shown in FIG. 3(B).

Figure 5A:
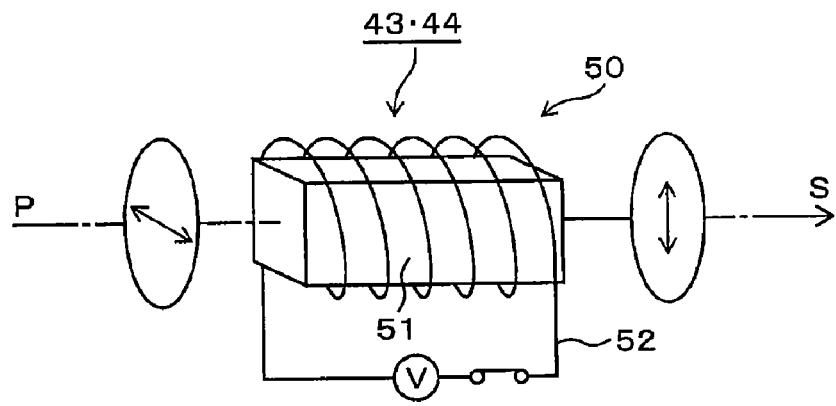
FIG. 5(A) is a schematic view of a Faraday element, where a current is supplied to a coil of the Faraday element.
Figure 5B:
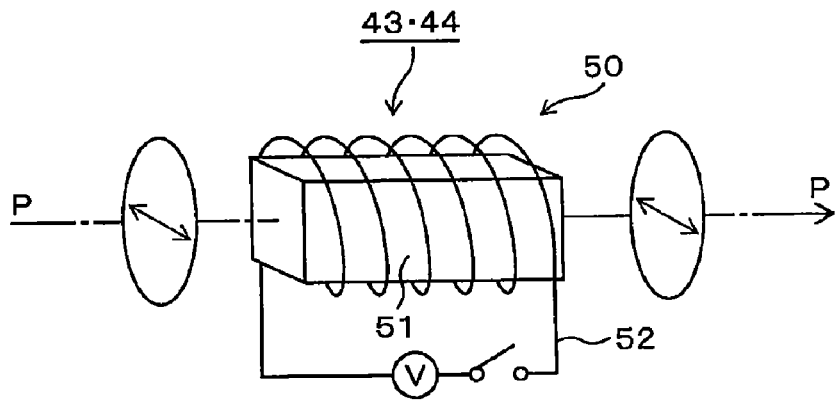
FIG. 5(B) is a schematic view of the Faraday element where a current is not supplied to the coil of the Faraday element.
Figure 6:
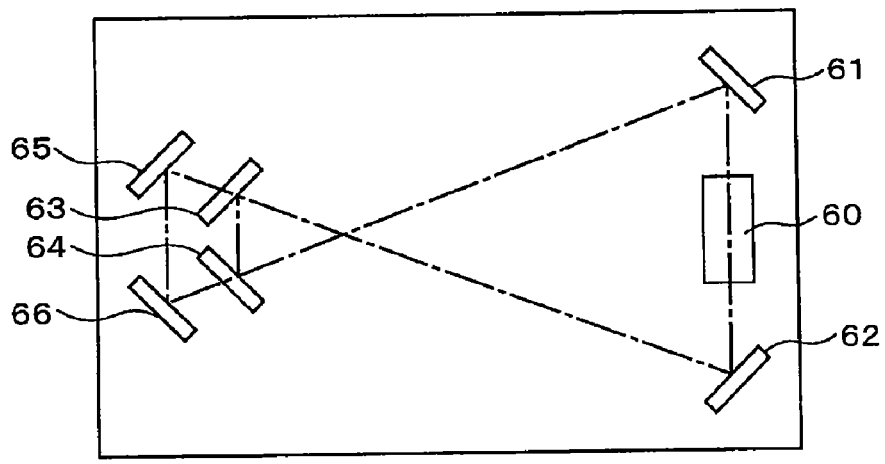
FIG. 6 is a top plan view of a conventional semiconductor ring laser gyro.

Description will now be made on a case in which the polarization plane rotating elements 43 and 44 are a Faraday element. FIG. 5(A) is a schematic view of a Faraday element 50, where a current is supplied to a coil of the Faraday element 50, and FIG. 4(B) is a schematic view of the Faraday element 50, where a current is not supplied to the Faraday element 50. The Faraday element 50 includes a magnetic crystal 51 of rare-earth iron garnet, for example, yttrium iron garnet, and a coil 52 wound around the magnetic crystal 51. Referring to FIG. 5(A), when a current is supplied to the coil 52, P polarization light entering the Faraday element 50 and transmitting therethrough rotates its polarized wave plane by 90 degrees and turns into S polarization light. On the other hand, referring to FIG. 5(B), when a current is not supplied to the coil 52, P polarization light entering the Faraday element 50 transmits therethrough without rotating its polarized plane and exits as P polarization light. Thus, when a current is supplied to the Faraday element 50, P polarization lights emitted from the semiconductor laser 2 turn into S polarization lights by the polarization plane rotating elements 43 and 44 constituted by the Faraday element 50, and the S polarization lights are guided into the optical circuit R1 about the first axis by the polarization beam splitters 41 and 42 as shown in FIG. 3(A), and on the other hand, when a current is not supplied to the Faraday element 50, P polarization lights emitted from the semiconductor laser 2 transmit through the polarized plate rotating elements 43 and 44 without rotating its polarized wave plane and are guided into the optical circuit R2 about the second axis by the polarization beam splitters 41 and 42 as shown in FIG. 3(B). Each of the lights which have traveled through the two optical circuits R1 and R2 turns back into P polarization light by the polarization plane rotating element 43 or 44 and enter the other end of the semiconductor laser 2.

(Advantage of the Third Embodiment)

The advantage of the third embodiment will be described below. Generally, light emitted from a semiconductor laser is polarized by an active layer structure. Based on the polarization property of a semiconductor laser, light emitted from the semiconductor laser 2 is split into the two optical circuits R1 and R2 without attenuation of light amount. That is to say, the polarization planes of lights emitted from the semiconductor laser 2 are controlled by the polarization plane rotating elements 43 and 44, and the polarization beam splitters 41 and 42 are adapted to selectively split and shield the optical circuits R1 and R2 according to the polarization planes. Consequently, the total amount of light emitted from the semiconductor laser 2 can be utilized to measure the rotational angular velocities about the two axes. Also, when the polarization beam splitters 41 and 42 are a cube polarization prism, light can be efficiently split into the two optical circuits R1 and R2 by using the dielectric film or multilayer film excellent in transmitting and reflecting P polarization light and S polarization light. Since the cube polarization prism does not requires a robust mounting mechanism unlike a plate polarization prism, the optical axes of the polarization beam splitters 41 and 42 which are important as a bifurcation point of the two optical circuits R1 and R2 can be easily adjusted. Further, since the liquid crystal element 48 or the Faraday element 50 is of a simple structure and can control the polarization plane of incident light at a high speed, the measurement axis can be selected with a small space and at a high speed.

The present invention can be applied for attitude control of aircraft, rocket, artificial satellite, submarine, robot, automobile, construction equipment and the like, and for use as a semiconductor ring laser gyro for autonomous navigation.

What is claimed is:

1. A semiconductor ring laser gyro comprising:
   a semiconductor laser for emitting light from each of both ends thereof;
   a splitting means for splitting and guiding the light emitted from the semiconductor laser into two axis directions;
   a plurality of reflecting means for reflecting the light split and guided by the splitting means into the two axis directions;
   two optical circuits, in each of which the plurality of reflecting means cause the light to travel in a plane and to enter an end of the semiconductor laser opposite to the end from which the light is emitted; and
   a blocking means for blocking light traveling in one of the two optical circuits.

2. A semiconductor ring laser gyro according to claim 1, wherein the one semiconductor laser is disposed at a portion of an optical path shared in common by the two optical circuits which are disposed in respective different planes.

3. A semiconductor ring laser gyro according to claim 1, wherein the splitting means is a beam splitter which includes a transmissive mirror surface for guiding light into an optical circuit about a first axis and a reflection surface for reflecting light having transmitted through the transmissive surface into an optical circuit about a second axis.

4. A semiconductor ring laser gyro according to claim 1, wherein the splitting means and the blocking means are comprised by a combination of a polarization beam splitter and a polarization plane rotating element disposed between the polarization beam splitter and the semiconductor laser.

5. A semiconductor ring laser gyro according to claim 4, wherein the polarization beam splitter is a cube polarization prism which includes two rectangular prisms sandwiching one of a dielectric film and a dielectric multilayer film.

6. A semiconductor ring laser gyro according to claim 4, wherein the polarization plane rotating element is one of a liquid crystal element and a Faraday element.

* * * * *